United States Patent [19]

Schnürle et al.

[11] Patent Number: 4,502,447

[45] Date of Patent: Mar. 5, 1985

[54] METHOD OF AND DEVICE FOR SUPERVISING ELECTRICAL FUEL INJECTION SYSTEMS

[75] Inventors: Hans Schnürle, Walheim; Herbert Arnold, Eberdingen; Michael Horbelt, Schwieberdingen, all of Fed. Rep. of Germany

[73] Assignee: Robert Bosch GmbH, Stuttgart, Fed. Rep. of Germany

[21] Appl. No.: 542,066

[22] Filed: Oct. 14, 1983

[30] Foreign Application Priority Data

Oct. 20, 1982 [DE] Fed. Rep. of Germany ....... 3238752

[51] Int. Cl.³ .............................................. G06F 11/00

[52] U.S. Cl. ..................................... 123/479; 123/630

[58] Field of Search .................. 123/479, 630, 198 D, 123/198 DC; 364/431; 235/128, 153 AK

[56] References Cited

U.S. PATENT DOCUMENTS

| | | | |
|---|---|---|---|
| 3,938,075 | 2/1976 | Reddy | 123/479 |
| 3,948,228 | 4/1976 | Luchaco | 123/479 |
| 4,049,957 | 9/1977 | Kera et al. | 123/479 |
| 4,357,919 | 11/1982 | Hatter et al. | 123/479 |
| 4,383,409 | 5/1983 | Otsuka et al. | 123/479 |

*Primary Examiner*—Raymond A. Nelli

*Attorney, Agent, or Firm*—Michael J. Striker

[57] ABSTRACT

Disclosed are a method and a device for indicating the malfunction of an apparatus for generating injection control pulses for a fuel injection system. The method compares relatively narrow trigger pulses derived from ignition pulses with the fuel injection control pulses. When the injection control pulses coincide with the trigger pulses, no indication is present. Only when an injection control pulse is missing does the trigger pulse prevail and trigger a bistable switching circuit which activates an optical or acoustical indicator.

8 Claims, 2 Drawing Figures

METHOD OF AND DEVICE FOR SUPERVISING ELECTRICAL FUEL INJECTION SYSTEMS

BACKGROUND OF THE INVENTION

The present invention relates in general to electrical fuel injection systems of an internal combustion engine and in particular to a method of and a device for supervising the operation of a control apparatus which produces control pulses for such injection systems.

Conventionally, motor vehicles are equipped with electric fuel injection systems which achieve an improved fuel consumption and consequently reduced pollution. The electrically controlled fuel injection guarantees that IC engines are without problems supplied with the most effective amount of fuel irrespective of whether the engine operates in its idling, coasting, partially loaded or fully loaded modes of operation. The injection system provides namely an optimum adjustment to the above operational modes and enables the operator to have a well balanced and uniform control of the motor vehicle.

It is true that contemporary mechanical or electrical fuel injection systems operate without problems and failures. On the other hand, it cannot be excluded that under certain circumstances temporary failures may occur in the control apparatus for the electrical fuel injection system for example. Such interferences may consist in a random or repeated skipping of individual control pulses which may occur under certain driving conditions of the motor vehicle only. Such occasional misfunctions in practice cannot be removed by the operator of the vehicle, inasmuch as the complicated construction of electrical or electronic control devices for fuel injection systems prevents an investigation and check-up in this area. On the other hand, any occasional or repeated loss of fuel injection pulses or, on the other hand, an excessive generation of such pulses produces a deviation from the prescribed fuel-air mixture ratio from values prescribed for different operational conditions.

SUMMARY OF THE INVENTION

It is therefore a general object of the present invention to overcome the aforementioned disadvantages.

More particularly, it is an object of the invention to provide an improved method of and device for indicating any irregular operation of the fuel injection control, particularly in the case when the operator cannot recognize from the otherwise satisfactory operation of the gas engine such transitory failures. The indication can be either optical or acoustical or a combination of both.

An additional object of this invention is to provide such an indicator of failures of the control device which reacts already to the loss of a single pulse, so that the operator may become aware of this misfunction and may have the fuel injection system tested in a professional workshop.

A further object of the invention is to provide such an improved supervising device which not only detects the loss of fuel injection pulses but also the generation of excessive numbers of such pulses, which may lead to excessive richness of the fuel-air mixture.

In keeping with these objects and others which will become apparent hereinafter, one feature of the method of this invention resides in the steps of deriving a first train of pulses which are synchronized with the rotary speed of the engine, then deriving a second train of trigger pulses which coincide with the control pulses for the fuel injection pulses and also with the first train of pulses, then comparing the injection control pulses with the flanks of opposite polarity of the trigger pulses so as to produce a combined comparison signal of the trigger pulses, so that in the absence of a control pulse the resulting combined signal drops to a low level until a next control pulse occurs, and indicating the low level of the combined signal on an external indicator.

The device of this invention includes a pulse shaper and a frequency divider for producing a first train of rectangular pulses derived from the ignition pulses, a differentiator for deriving from the rectangular pulses a synchronized train of trigger pulses, a bistable multivibrator having one input connected to the differentiator and another input connected to the source of injection control pulses, and an output connected to an indicator, such as a light-emitting diode which lights up in response to the absence of a fuel injection control pulse or in response to the non-coincidence of the latter with the trigger pulses.

The device of this invention is of a very simple construction and can be equipped also with means for selectively indicating the thrust cutoff of the engine, occurring for example when the motor vehicle coasts at a relatively high speed without actuation of the gas pedal, as is frequently the case when driving in mountains. The latter option enables that the operator is always informed about the proper function of the supervising device and about the fact that the thrust has been cut off. If desired, the indication of the interruption of the control pulses during the no-load condition of the engine can be readily disconnected and can be made even after the installation of the device in a completed motor vehicle.

The novel features which are considered characteristic for the invention are set forth in particular in the appended claims. The invention itself, however, both as to its construction and its method of operation, together with additional objects and advantages thereof, will be best understood from the following description of specific embodiments when read in conjunction with the accompanying drawing.

DESCRIPTION OF THE PREFERRED EMBODIMENT

The basic idea of this invention resides in comparing injection control pulses generated by a control apparatus and fed to injection valves, with a first train of comparison pulses generated independently from the injection control pulses but being synchronous with the latter and obtaining from the comparison an information whether each of the injection pulses is coincident with the corresponding comparison pulse, that is, to ascertain whether all injection control pulses have been generated. The result of the comparison is utilized for triggering an indication when a misfunction in the electrical control apparatus occurs.

Figure 1:
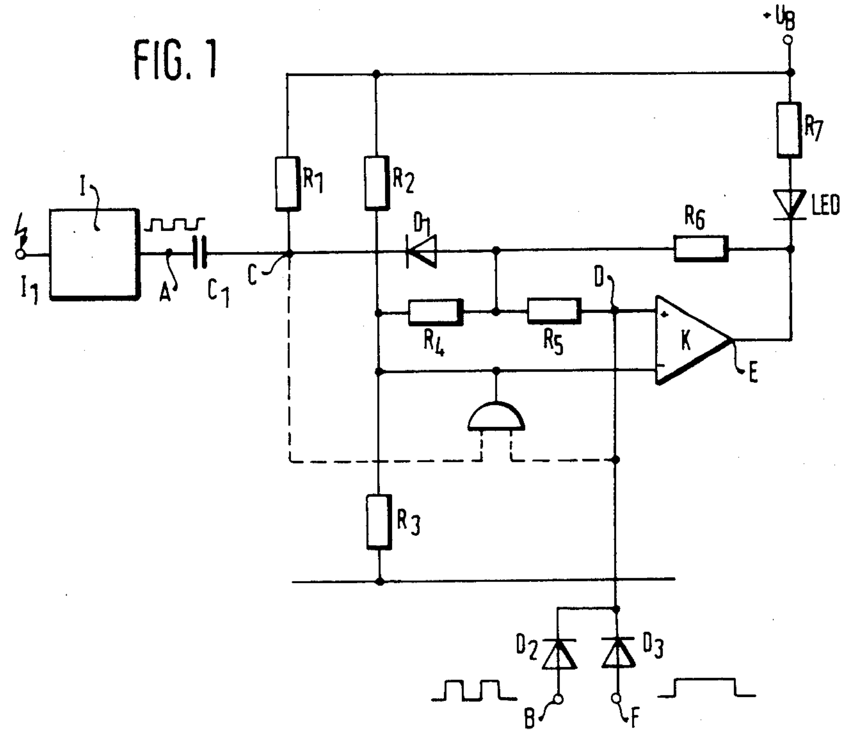
FIG. 1 shows a circuit diagram of a device for supervising the generation of control pulses for a fuel injection system according to this invention.

In the embodiment according to FIG. 1, an operational amplifier is connected as a bistable multivibrator K whose output E is coupled via a feedback resistor R6 to a non-inverting (+) input of the amplifier. The inverting (−) input of the operational amplifier is connected to a common point of a voltage divider consisting of resistors R2 and R3 which is connected to a source of constant voltage. Another voltage divider R4, R5 is connected between the non-inverting input of the amplifier K and the common point of the first-mentioned voltage divider R2, R3. The feedback resistor R6 is connected to the common point of the second voltage divider R4, R5, and to the same common point of the second divider a train of differentiated trigger pulses is applied, as will be explained in greater detail below.

In order to generate a nominal train of pulses at a rate and distribution corresponding to the fuel injection control pulses, there is provided a pulse shaper and frequency divider I whose input is connected to a generator of reference pulses which are synchronous with injection pulses generated by a non-illustrated fuel injection control apparatus. The source of comparison pulses may be for example the ignition device of the engine. The ignition pulses $I_1$ are shaped in the stage I into a succession of rectangular pulses whose frequency is divided so as to match the generation of the injection control pulses. These rectangular pulses are differentiated in a differentiator consisting of an RC member, namely of a resistor R1 and a capacitor C. The sequence of differentiated trigger pulses is fed via a diode D1 to the common point of the second voltage divider R4, R5 wherefrom the pulses are applied to the non-inverting input of the bistable multivibrator K. The non-inverting input (connection point D) is further connected via a diode D2 to an input terminal B for injection control pulses and via another diode D3 to an input terminal F for thrust cutoff pulses. The output E of the bistable multivibrator K is connected to the cathode of a light-emitting diode LED whose anode is connected via load resistor R7 to the + pole of the voltage source $U_B$.

Figure 2:
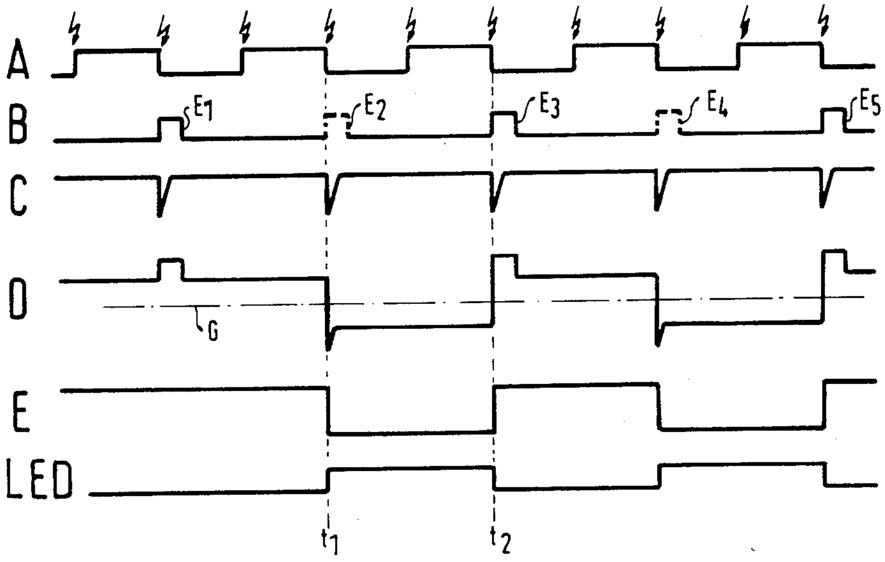
FIG. 2 shows time plots of voltages produced at different points of the circuit of FIG. 1.

Referring now to the plot diagrams illustrated in FIG. 2, the operation of the supervising device of FIG. 1 is as follows:

From the ignition pulses $I_1$ applied to the input of pulse shaper I, a first train of rectangular pulses is derived at the output of the shaper I, as indicated in FIG. 2A. The frequency divider in the stage A synchronizes the falling flanks of the shaped ignition pulses (derived for example from a four-cylinder gas engine) with the rising flanks of fuel injection control pulses (E1 through E5) derived from a non-illustrated injection control apparatus and applied to the input terminal B. The succession of the injection control pulses is illustrated in FIG. 2B and the succession of differentiated trigger pulses derived from the falling flanks of the injection pulses is illustrated in FIG. 2C. It will be seen from these Figures that each effective injection pulse (E1, E3 and E5) indicated in FIG. 2B by full lines suppresses the relatively narrow negative trigger pulse which is simultaneously applied to the non-inverting input of the bistable multivibrator K and at the same time switches over the multivibrator to a condition at which a high level signal appears at its output E. During this high level signal, no indication appears on the light-emitting diode LED, inasmuch as both terminals of the latter are practically at the same potential. Due to the feedback of the output signal of the multivibrator K to its non-inverting input (+), the level of input voltage at the point B is above the level G (indicated by dash-dot lines in FIG. 2D) of the inverting input (−) of the bistable multivibrator. At the time point $t_1$ it is assumed that, due to an accidental interference, injection pulses E2 and E4 are skipped (FIG. 2B) and consequently that the narrow trigger pulse (FIG. 2C) is no longer neutralized by the opposite polarity of the control pulse and triggers the switchover of the bistable multivibrator K from its high output to its low output signal, as indicated in the plot of FIG. 2D. The low voltage level of the signal E at the output of multivibrator K (FIG. 2E) causes the ignition of the light-emitting diode for the time period $t_1$ to $t_2$, corresponding to the time interval between the missing injection control pulse and the subsequent effective injection control pulse. At the time point $t_2$ the effective control pulse E3 coincides with the occurrence of the trigger pulse, and due to its substantially larger width it suppresses the latter and the bistable multivibrator K is switched back to its high voltage level at its output, and the light-emitting diode LED is extinguished. In the absence of a warning signal indicates that the control apparatus for the ignition system operates correctly.

The skipping of injection control pulses (E2, E4) can be also introduced intentionally by a thrust cutoff during idling operation of the motor. In this case a momentary activation of the light-emitting diode may be of advantage, inasmuch as the operator is visually notified that the gas pedal is in its initial position and therefore that a coasting or thrustless operation of the engine should take place. The activation of LED during the thrust cutoff indicates proper function both of the electrical control apparatus of the injection system and also of the supervising device itself.

However, if such a repeated indication is undesirable by the operator, then assuming that the subsequent injection control pulse E4 is also lost due to the thrust cutoff, then an inhibiting signal is derived from the injection control apparatus and applied to the input terminal F. This cutoff pulse has a substantially longer duration than the normal injection control pulses. The duration of the cutoff pulse may correspond for example to the time interval indicated by the dash-dot line in FIG. 2D, and during this time interval all trigger pulses must pass and the output E of the bistable multivibrator remains at its high level, and the LED is inactive.

In addition, the invention offers the possibility to detect injection control pulses which are in excess relative to the ignition pulses. For this purpose, there is provided an OR-gate having its output connected to the inverting (−) input of the bistable multivibrator. As indicated by dashed lines in FIG. 1, one input of the OR-gate is connected to the non-inverting input of the multivibrator at the connection point D, and the other input of the OR-gate is connected to the connection point C at the output of the differentiator. As a consequence, an output pulse at the OR-gate is generated only when an excessive injection control pulse occurs at the input point D while no trigger pulse is generated at the other input at the connection point C.

It will be understood that each of the elements described above, or two or more together, may also find a useful application in other types of constructions differing from the types described above.

While the invention has been illustrated and described as embodied in a specific example of a supervising device for a fuel injection control means, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method of supervising the operation of a control apparatus which produces control pulses for an electrical fuel injection system of an IC engine, comprising the steps of deriving from a rotary speed information of the engine a train of trigger pulses, synchronizing the trigger pulses with the control pulses, combining the control pulses with the synchronized trigger pulses to produce a train of combined pulses in which in the case of coincidence the trigger pulses merge with the control pulses and are ineffective while in the absence of a control pulse the corresponding trigger pulse becomes effective and triggers an indicating device.

2. A method as defined in claim 1, further comprising the steps of deriving a wide cutoff pulse and superposing the wide cutoff pulse with the trigger pulses to suppress the indication during the thrust cutoff of the engine.

3. A device for supervising the operation of a control apparatus which produces control pulses for an electrical fuel injection system of an internal combustion engine, comprising means for generating a first train of pulses which are proportional to the rotary speed of the engine, means for differentiating said first train of pulses to produce a coinciding train of narrow trigger pulses, bistable switching means having one input connected to said differentiating means, another input connected to said control apparatus and an output producing a cynchronized combination of said trigger pulses and said injection control pulses; and indicating means connected to the output of said bistable switching means to indicate the coincidence or non-coincidence of the trigger pulses with the injection control pulses.

4. A device as defined in claim 3, further including an additional terminal connected to the other input of said bistable switching means for applying thereto a long cutoff pulse for suppressing the trigger pulses during thrust cutoff of the engine.

5. A device as defined in claim 3, wherein said means for generating the first train of pulses is a pulse shaper and frequency divider having an input connected to a source of ignition pulses and an output producing said first train of substantially rectangular pulses at the same rate as that of the injection control pulses, said differentiating means being an RC member having an input connected to the output of the pulse shaper and frequency divider and an output connected to a voltage divider, said bistable switching means being a bistable multivibrator having one input connected to said voltage divider and another input connected to a terminal for the injection control pulses.

6. A device as defined in claim 5, wherein the output of the bistable multivibrator is connected to a light-emitting diode.

7. A device as defined in claim 5, wherein the bistable multivibrator includes an operational amplifier whose inverting input is connected via another voltage divider to a source of constant potential, said first-mentioned voltage divider being connected to the other voltage divider, and the output of the operational amplifier being connected via a feedback resistor and via said first-mentioned voltage divider to the non-inverting input.

8. A device as defined in claim 5, further comprising an OR-gate having its output connected to the inverting input of the operational amplifier of the bistable multivibrator, an input of the OR-gate being connected to the non-inverting input of the operational amplifier and another input of the OR-gate being connected to the output of the differentiator to switch over the state of the bistable multivibrator when an excessive injection control pulse is generated.

* * * * *